United States Patent [19]

Tracey

[11] 4,430,294

[45] Feb. 7, 1984

[54] PROCESS FOR PRODUCING POROUS NICKEL BODIES

[75] Inventor: Victor A. Tracey, Solihull, England

[73] Assignee: Inco Europe Limited, London, England

[21] Appl. No.: 270,048

[22] Filed: Jun. 3, 1981

[30] Foreign Application Priority Data

Jun. 9, 1980 [GB] United Kingdom ............... 8018807

[51] Int. Cl.$^3$ .............................................. B22F 3/10
[52] U.S. Cl. ......................................... 419/2; 419/10; 419/58; 419/59
[58] Field of Search ........................ 75/201, 222, 224; 428/550

[56] References Cited

U.S. PATENT DOCUMENTS

| | | | |
|---|---|---|---|
| 884,930 | 4/1908 | Jungner. | |
| 1,955,115 | 4/1934 | Drumm | 136/31 |
| 2,251,913 | 8/1941 | Brennan | 136/19 |
| 2,544,112 | 3/1951 | Schneider | 136/29 |
| 2,672,495 | 3/1954 | Fleischer | 136/28 |
| 3,321,286 | 5/1967 | Clark | 29/182.5 |

FOREIGN PATENT DOCUMENTS

| | | |
|---|---|---|
| 662791 | 7/1938 | Fed. Rep. of Germany. |
| 1261401 | 4/1961 | France. |
| 34-10125 | 6/1959 | Japan. |
| 34-6575 | 9/1959 | Japan. |
| 331080 | 6/1930 | United Kingdom. |
| 955839 | 4/1964 | United Kingdom. |
| 972686 | 10/1964 | United Kingdom. |
| 1049324 | 11/1966 | United Kingdom. |

OTHER PUBLICATIONS

Gummeson, P. U. et al., "The System Iron-Carbon in Powder Metallurgy", *Iron Powder Metallurgy*, Plenum Press, New York, (1968), pp. 309–310.
Treatise on Powder Metallurgy, vol. 1, pp. 638–639 (1949, Interscience Publishers, Inc., New York).

*Primary Examiner*—Brooks H. Hunt
*Assistant Examiner*—Anne Brookes
*Attorney, Agent, or Firm*—Edward A. Steen; Francis J. Mulligan, Jr.; Raymond J. Kenny

[57] ABSTRACT

Porous bodies are produced by sintering a body of nickel powder incorporating from 0.35 to 2.0% by weight of carbon under a reducing gas at a temperature above 750° C. but below 1050° C. At least part of the carbon may be mixed with the powder as finely divided graphite.

4 Claims, 6 Drawing Figures

PROCESS FOR PRODUCING POROUS NICKEL BODIES

This invention relates to the production of porous bodies by sintering nickel powder.

BACKGROUND OF THE INVENTION

For some applications of sintered nickel bodies, in particular as electrodes for nickel alkaline batteries, it is desirable to have the highest possible porosity consistent with adequate strength. In present commercial practice high porosity is achieved by the use of carbonyl nickel powder of the type that consists of interlocking chains of agglomerated particles. Such powder was formerly described as 'Type B' powder, and is now available commercially as Inco 'type 255' powder. The strength obtainable for a given porosity is generally greater the higher the temperature to which the powder is heated for sintering. However, even using Type B powder, the porosity that can be attained before the strength becomes unacceptably low does not generally exceed 80%.

To assist in achieving high porosity it has been proposed to mix the nickel powder with a spacing agent that is eliminated during or after sintering, leaving pores in its place. During the sintering process, bonds form between adjacent powder particles, and there is a tendency for the structure to collapse and so lose porosity. The spacing agent helps prevent this collapse.

According to one such proposal, in French Pat. No. 1 261 401, graphite is used as the spacing agent. A mixture of nickel powder with a large proportion, for example 50% by volume, of graphite is partially sintered in an inert atmosphere, and the resulting body is then heated in a decarburising atmosphere to remove the graphite. This process however has the disadvantage that a considerable amount of time is required to eliminate the graphite and produce the final porous structure. This greatly increases the duration of the overall process and thus increases its cost, as it is necessary to maintain the structure at an elevated temperature while the graphite is removed.

Typically the electrodes for nickel alkaline batteries are made by coating nickel powder on to a mesh support and sintering the powder under a reducing gas such as a nitrogen-hydrogen mixture, or a burnt gas which contains nitrogen, hydrogen, and small amounts, e.g. 7-8% by volume, of carbon monoxide and carbon dioxide, at a temperature in the range from 800° to 1000° C. The powder is conveniently applied to the support as a slurry in a liquid medium that is then removed by evaporation to produce the green body of metal powder to be sintered. To achieve the highest porosity, little or no pressure is applied before sintering.

SUMMARY OF THE INVENTION

The present invention is based on the discovery that the relationship between strength and porosity of the sintered product is critically dependent upon the composition of the gas that fills the interstices in and between the particles of nickel powder. This gas will be referred to hereinafter as the microatmosphere. The composition of the microatmosphere will generally differ from that of the gas supplied to the sintering furnace, owing to the slowness of diffusion of the gas into the body of nickel powder, to reaction of this gas with the powder, or both. We have now found that for a given sintering temperature the strength of the sintered product may be increased relative to its porosity by ensuring that the microatmosphere present during the heating for sintering contains a substantial proportion of a gaseous compound or compounds of carbon.

According to the invention, carbon is incorporated in the nickel powder in an amount of from 0.35 to 2.0% by weight of the nickel powder, a green body is formed from the powder and the body is sintered under a reducing gas at a temperature above 750° C. but below 1050° C. By "reducing gas" is meant a gas or gas mixture that will prevent the oxidation of nickel to nickel oxide during sintering. It will be appreciated that this reducing gas supplies a macroatmosphere which is maintained around the compact during sintering.

The surface of the nickel powder particles generally carries an oxide coating. When carbon is incorporated in the powder the desired microatmosphere containing a substantial proportion of carbon compounds is generated as the compact is heated in the furnace under a reducing gas by reaction of the carbon with the oxide and/or with any water vapour in the sintering gas i.e. the gas used to provide the reducing atmosphere. As a result each powder particle will be enveloped in a microatmosphere containing carbon monoxide and carbon dioxide. Although the mechanism underlying the invention is not completely understood and the applicants do not wish to be bound by any theory relating thereto, it is believed that the presence of carbon compounds in the microatmosphere of the particles delays the onset of sintering between the particles as the compact heats up, possibly by affecting the mass transport necessary for formation of necks between adjacent particles. The result is that when sintering does start, it will be a relatively rapid process because of the high temperature that will have been reached. Since the sintering occurs rapidly, the usual "collapse" of the compact during sintering with consequent loss of porosity will not occur to any appreciable extent.

The provision of a microatmosphere of carbonaceous gas is essential to the process of this invention. It should be appreciated that simply mixing such a gas with the sintering gas which provides the macroatmosphere would not have the same effect since the powder compacts are formed in air and thus have air in their pores. In the length of time taken for the gas of the macroatmosphere to reach these pores, at least at temperatures below 1000° C., sintering would probably begin.

DETAILED DESCRIPTION OF THE INVENTION

Figure 1:
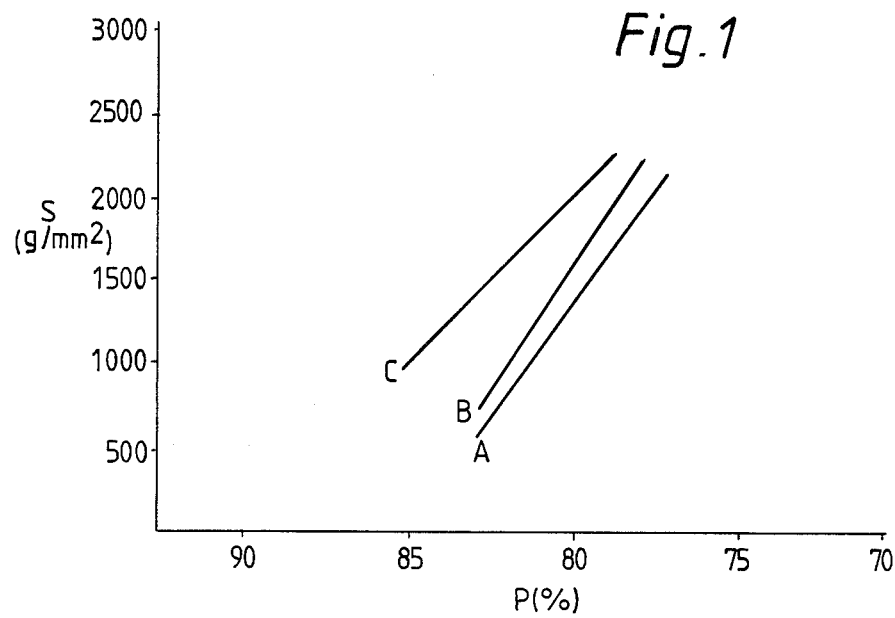
FIG. 1 is a graph plotting bend strength vs. porosity.

The sintered product may have a higher strength for a given porosity, or a higher porosity for a given strength, or a combination of the two. Thus, if strength is the limiting factor in that the porous body has to have at least a given minimum strength as with the electrodes mentioned above the process of the invention offers the possibility of increasing the porosity and reducing the amount of nickel required. Alternatively, since it is known that the strength of a sintered body of given porosity increases roughly in proportion with the sintering temperature, the sintering temperature may be reduced since a body produced by the process of the present invention will have the same strength as a conventionally produced body of the same porosity sintered at a higher temperature.

A minimum temperature of 750° C. is required to effect adequate sintering, but no advantage is obtained by using temperatures of 1050° C. or above. Generally the sintering temperature should not exceed 1025° C., and preferably it should not exceed 1000° C. A particularly advantageous range is from 850° to 950° C.

At carbon contents below 0.35% or above 2% the strength of the sintered body obtained under given sintering conditions falls off, and the carbon content is preferably from 0.7 to 1.6% by weight of the nickel powder, a particularly preferred quantity being 1.1%.

Advantageously, the nickel powder used is a powder that has been produced by the decomposition of nickel carbonyl such as the Type B powder mentioned above. Powder produced by other processes, such as hydrometallurgical processes, may also be used.

Carbonyl nickel powder commonly contains about 0.25% by weight of carbon formed during its production by thermal decomposition of nickel carbonyl. Further carbon may be incorporated by mixing the nickel powder with finely divided graphite. Alternatively all or part of the additional carbon may, if desired, be incorporated by varying the conditions in the decomposer so as to increase the proportion of carbon formed with the nickel powder. This has the advantage of ensuring very fine and uniform distribution of the carbon throughout the powder.

For the same reason, if carbon is added to the nickel powder it should be as finely-divided as is practicable, and we prefer to use graphite powder of the same or a smaller particle size than the nickel powder.

Although sintering may be carried out under a reducing gas which does not itself contain a carbon compound, such as a mixture of nitrogen with 10% by volume of hydrogen, it is preferred to add some carbon compound to the sintering gas as this is found to enhance the effect produced by the carbon in the powder. Examples of gaseous compounds which may be added are carbon monoxide, carbon dioxide and methane. Of these, the two carboxy gases are preferred since methane has a tendency to break down during sintering and leave sooty deposits in the sintering furnace. With the carbon monoxide/carbon dioxide system, the relative amounts of the two gases present depend upon the sintering temperature. At temperatures above 1000° C., only carbon monoxide will be present whilst as the sintering temperature is reduced below this figure, increasing amounts of carbon dioxide will also be present. Preferably then, the sintering gas contains from 15 to 20% by volume of a carboxy gas.

The process of the invention may be used in the production of self-supporting sintered bodies, e.g. by sintering green compacts of the nickel-carbon mixture, or of sintered bodies having a supporting skeleton, e.g. of wire mesh or perforated metal sheet, such as is commonly used for battery electrodes. In the latter case, the mixture of nickel and carbon may conveniently be formed into an aqueous slurry that is applied to the support, dried to form the green body, and sintered.

The term 'green body' of nickel powder thus includes both green compacts that have been rendered self-supporting by compression and uncompacted or compacted bodies of powder that incorporate a separate means of support.

It is also possible to incorporate a spacing agent which will decompose during sintering in the nickel powder-containing slurry. Suitable spacing agents are ethyl cellulose and oxamide.

The invention is also useful for the production of porous nickel products other than battery electrodes, e.g. filters, electrolyser plates and sound damping material.

The invention will now be described in more detail with reference to the following examples, in each of which the test pieces were prepared as follows: 600 g of 'Inco' Type 255 powder having a particle size of about 2 to 4 microns (measured by the Fisher subsieve Sizer) and containing 0.25 wt % carbon with traces of iron, sulphur and oxygen, were slurried in 1 liter of a 3% aqueous solution of methyl cellulose with 10 cm$^3$ of a defoaming agent. For some of the tests, varying amounts of graphite having a particle size of about 2 microns were added to the slurry. The slurry was then coated on to both sides of a support consisting of nickel-plated perforated iron strip of thickness 100 microns. The coated supports were dried in air at a temperature below 100° C. to form green bodies which were sintered for five minutes under different conditions in the various tests in a furnace through which a sintering gas was passed. The thickness of the dried, sintered test pieces was from 0.6 to 0.8 mm.

EXAMPLE 1

Three series of tests designated A to C were performed. Series A contained no carbon whereas in Series B and C the slurry contained graphite in an amount sufficient to make the carbon content of the powder 1% by weight of the nickel powder.

In series A and B, the sintering was performed in an atmosphere of nitrogen containing 10% by volume of hydrogen (hereinafter referred to as a conventional sintering gas) whilst in Series C the sintering gas had the composition (by volume) 70% nitrogen, 10% hydrogen and 20% carbon monoxide (hereinafter referred to as carbonaceous gas). Individual test pieces were sintered at different temperatures in the range from 850° to 1050° C. The porosity and bend strength of each of the sintered structures was determined and the results are shown in FIG. 1 of the accompanying drawings in which bend strength S in g/mm$^2$ (determined by three-point bend tests) is plotted as ordinates against % porosity P (corrected for the presence of the support) as abscissae.

The results clearly show the much improved strength relative to porosity of the sintered bodies B and C made according to the invention with those made by conventional sintering under a reducing gas (series A).

The residual carbon contents of the test pieces made by sintering the carbon-containing powder mixtures (series B and C) were 500–800 ppm (0.05–0.08%), while the products of series A with no added carbon contained 100–200 ppm (0.01–0.02%) carbon.

EXAMPLE 2

Figure 2:
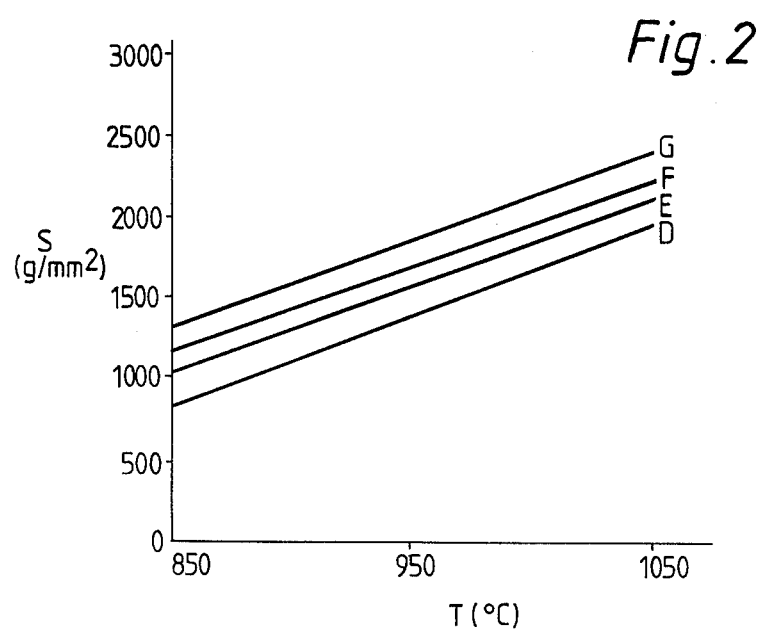
FIG. 2 is a graph plotting bend strength vs. sintering temperature.

In this example, a further four series of tests designated D to G were performed. In series F and G, the carbon content of the powder was again adjusted to 1% by weight of the nickel. In series E and G, carbonaceous sintering gas was used, whilst in series D and F, conventional sintering gas was used. For each series individual test pieces were sintered at temperatures in the range from 850° to 1050° C. The bend strengths of the sintered test pieces were determined by three point bend testing. FIG. 2 of the accompanying drawings shows bend strength in g/mm$^2$ plotted as ordinates against sintering temperatures for each of the series D to G as abscissae. It can be seen that in all cases the bend strength increases with the sintering temperature, and that for the same sintering temperature, test pieces produced in accordance with the invention (series F, and series G the preferred process) have superior bend strength to conventionally produced test pieces (series D), or test pieces produced using a sintering atmosphere including carbon monoxide but without carbon addition (series E). This improvement is obtained over the whole temperature range investigated.

EXAMPLE 3

Figure 3:
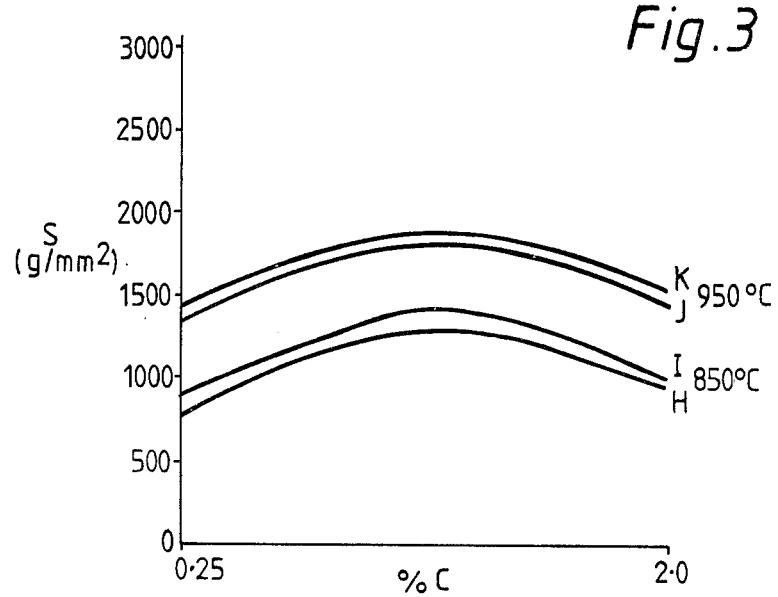
FIG. 3 is a graph plotting bend strength vs. carbon content.

Another four series of tests H to K were performed to investigate the relationship between bend strength of the sintered product and variations in the amount of carbon added to the powder. For all four tests, the amount of carbon in individual test pieces was varied between 0.25% by weight of the nickel powder (effectively no addition for the type of powder used) and 2.0% by weight of the nickel powder. For series H and J conventional sintering gas was used whilst for series I and K carbonaceous sintering gas was used. Test pieces in series H and I were sintered at 850° C. and in series J and K at 950° C. The bend strengths of the sintered test pieces were determined as before. FIG. 3 of the accompanying drawings shows bend strength plotted as ordinates against carbon content (as a % by weight of the nickel powder) as abscissae for the four series of tests. From the Figure, it can be seen that at both sintering temperatures and for both sintering gases, the bend strength increases with increasing carbon content, peaks at about 1.1%, and then falls away again. Again, at both sintering temperatures, the preferred process in which both carbon and carbonaceous gas are used produces stronger test pieces across the entire range of carbon addition tested. It can also be seen that, relatively speaking, the effect produced at 950° C. is less than that produced at 850° C. For example, the maximum increase in strength produced in test H is about 58% whereas that produced in test J is 32%.

At the higher temperature of 1050° C., however, although the test pieces sintered in gas containing carbon monoxide were stronger than test pieces sintered in conventional gas no effect was produced by the addition of carbon in either case. The reasons for this are not fully understood, but it is believed that at these very high sintering temperatures the composition of the macroatmosphere determines that of the microatmosphere.

EXAMPLE 4

Figure 4:
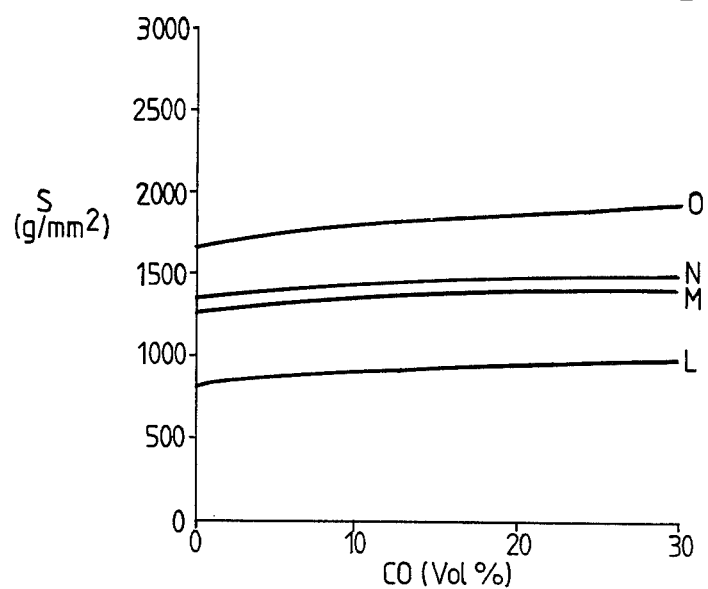
FIG. 4 is a graph plotting bend strength vs. carbon monoxide content in the sintering gas.

Four series of tests L to O were carried out to investigate the relationship between bend strength and variations in the amount of carbon monoxide in the sintering gas. Test pieces in series L and M were sintered at 850° C., and test pieces in series N and O at 950° C. Test pieces in series L and N were made from powder containing 0.25% C. (effectively no addition) whilst test pieces in series M and O were made from powder containing 1% by weight of carbon. For all four tests, the amount of carbon monoxide in the sintering gas for individual test pieces was varied between O (conventional sintering gas) and 30% by volume. The bend strengths of the sintered test pieces were determined as before. FIG. 4 of the accompanying drawings shows bend strength plotted against proportion of carbon monoxide in the sintering gas. It can be seen that for all four series, bend strength increases gradually with carbon monoxide content to an optimum concentration of about 20% by volume CO, after which no further increase is observed. Given the expected increase in bend strength with sintering temperature for all sintered test pieces, whether produced according to the invention or not (see Example 2), it may be seen that the test pieces according to the invention (series L and N) have superior bend strength to those produced conventionally (series K and M) across the range of CO addition tested.

A similar experiment was carried out at 1050° C. using two series of specimens one made from powder containing 0.25% carbon and the other from powder containing 1% C. Test pieces made from these two series were found to have similar bend strengths over the range of CO addition tested which was expected in view of the results of the 1050° C. test of Example 3. For both series, bend strength increased with CO content to an optimum value at about 20% CO.

EXAMPLE 5

Figure 5:
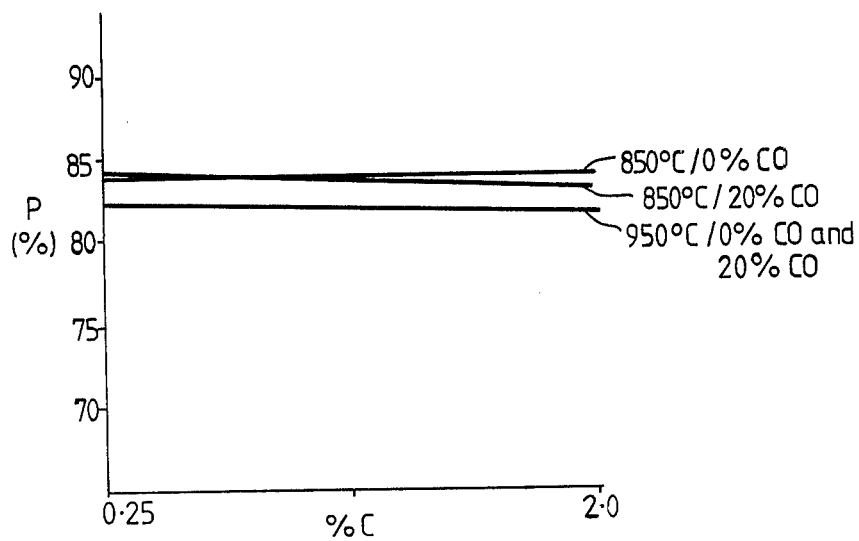
FIG. 5 is a graph plotting porosity vs. carbon in the powder.
Figure 6:
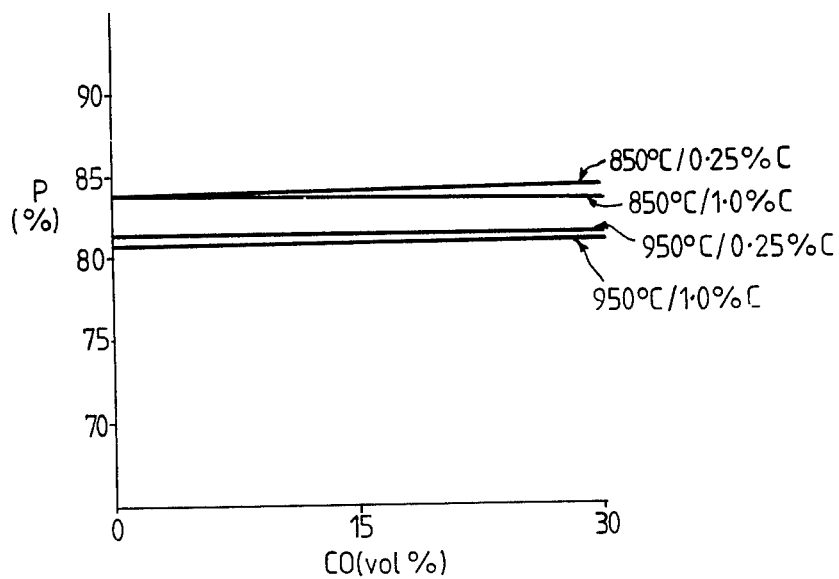
FIG. 6 is a graph plotting porosity vs. carbon monoxide in the sintering gas.

Finally, a series of eight tests was performed to investigate the effect of carbon in the powder and carbon monoxide in the sintering gas on the porosity of the sintered test pieces. The results are shown in FIGS. 5 and 6 of the accompanying drawings in which porosity (corrected for the presence of the support) is plotted as ordinates against increasing carbon and carbon monoxide contents respectively as abscissae. Both figures show that porosity changes very little with these parameters. The results shown in FIG. 5 are of particular interest since they show that the carbon does not act as a spacing agent in the process of the invention.

The process described herein, which has the object of producing highly porous sintered bodies, generally having a porosity of at least 75%, is to be distinguished from that disclosed in German specification No. 662 791. In that specification, nickel powder containing a few tenths of one percent of carbon is sintered at a higher temperature, e.g. 1100° C. for 10 hours, and then mechanically worked, for example by forging, to form a ductile, high-strength, essentially non-porous body.

I claim:

1. A process for the production of porous nickel bodies characterized by high strength, residual carbon content below about 0.08% (by weight), and a porosity exceeding 75%, the process consisting essentially of:
   (a) providing a carbonyl nickel powder,
   (b) forming a nickel-carbon mixture by adding carbon particles to the nickel powder in an amount sufficient to raise the carbon content thereof to about 0.35-2% (by weight) carbon, the particle size of the carbon no greater than the particle size of the nickel powder,
   (c) forming a green body from the mixture, (d) sintering the body in a reducing atmosphere, the temperature of the reducing atmosphere between 750° C. and 1050° C., the reducing atmosphere consisting essentially of hydrogen, nitrogen and 15-30% (by volume) carbonaceous gas, for the time necessary to maintain the porosity of the body above 75%.

2. The process according to claim 1 wherein the carbonaceous gas constitutes 15%-20% (by volume) of the reducing atmosphere and is selected from the group consisting of carbon dioxide and carbon monoxide.

3. The process according to claim 1 wherein the carbon content of the mixture is 0.7% to 1.6% (by weight).

4. The process according to claim 1 wherein the sintering temperature is between 850°-950° C.